(12) United States Patent
Singh et al.

(10) Patent No.: US 11,768,620 B2
(45) Date of Patent: Sep. 26, 2023

(54) METHODS FOR HANDLING STORAGE DEVICES WITH DIFFERENT ZONE SIZES AND DEVICES THEREOF

(71) Applicant: NetApp, Inc., Sunnyvale, CA (US)

(72) Inventors: Rohit Shankar Singh, Cary, NC (US); Douglas P. Doucette, San Diego, CA (US); Abhijeet Prakash Gole, Cupertino, CA (US); Sushilkumar Gangadharan, San Jose, CA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 16/857,919

(22) Filed: Apr. 24, 2020

(65) Prior Publication Data

US 2021/0334025 A1   Oct. 28, 2021

(51) Int. Cl.
*G06F 3/00* (2006.01)
*G06F 3/06* (2006.01)

(52) U.S. Cl.
CPC .......... *G06F 3/0644* (2013.01); *G06F 3/0604* (2013.01); *G06F 3/0659* (2013.01); *G06F 3/0689* (2013.01)

(58) Field of Classification Search
CPC .... G06F 3/0644; G06F 3/0604; G06F 3/0659; G06F 3/0689
See application file for complete search history.

(56) References Cited

U.S. PATENT DOCUMENTS

| | | | | |
|---|---|---|---|---|
| 8,001,352 | B1* | 8/2011 | Chatterjee | G06F 3/0649 |
| | | | | 711/165 |
| 10,496,330 | B1* | 12/2019 | Bernat | G06F 3/0688 |
| 2005/0273451 | A1* | 12/2005 | Clark | G06F 16/10 |
| 2007/0079105 | A1* | 4/2007 | Thompson | G06F 12/04 |
| | | | | 711/201 |

* cited by examiner

*Primary Examiner* — Craig S Goldschmidt
(74) *Attorney, Agent, or Firm* — Troutman Pepper Hamilton Sanders LLP (NetApp)

(57) ABSTRACT

The disclosed technology relates determining a first subset of a plurality drives having a first zone size and a second subset of the plurality of drives having a second zone size different from the first zone size, within a redundant array of independent disks (RAID) group. A prevailing zone size between the first zone size and the second zone size is determined. One or more logical zones within the determined first subset of the plurality of drives and the determined second subset of the plurality of drives for a received input-output operation is reserved based on the determined prevailing zone size. The received input-output operation is completed within the reserved one or more logical zones within the determined first subset of the plurality of drives and the determined second subset of the plurality of drives.

15 Claims, 14 Drawing Sheets

FIG. 4
RAID GROUP
Disk Drive 0
Mapping table 0
| Logical Zone | Physical Zone |
|---|---|
| 0 | 100 |
| 1 | 101 |
| 2 | 102 |
| 3 | 103 |
| 4 | 104 |
| . | . |
| . | . |
| 9 | 109 |
Write
Disk Drive 1
Mapping table 1
| Logical Zone | Physical Zone |
|---|---|
| 0 | 200 |
| 1 | 100 |
| 2 | 202 |
| 3 | 103 |
| 4 | 308 |
| . | . |
| . | . |
| 9 | 109 |
Parity Drive
Mapping table 2
| Logical Zone | Physical Zone |
|---|---|
| 0 | 300 |
| 1 | 100 |
| 2 | 102 |
| 3 | 202 |
| 4 | 308 |
| . | . |
| . | . |
| 9 | 310 |

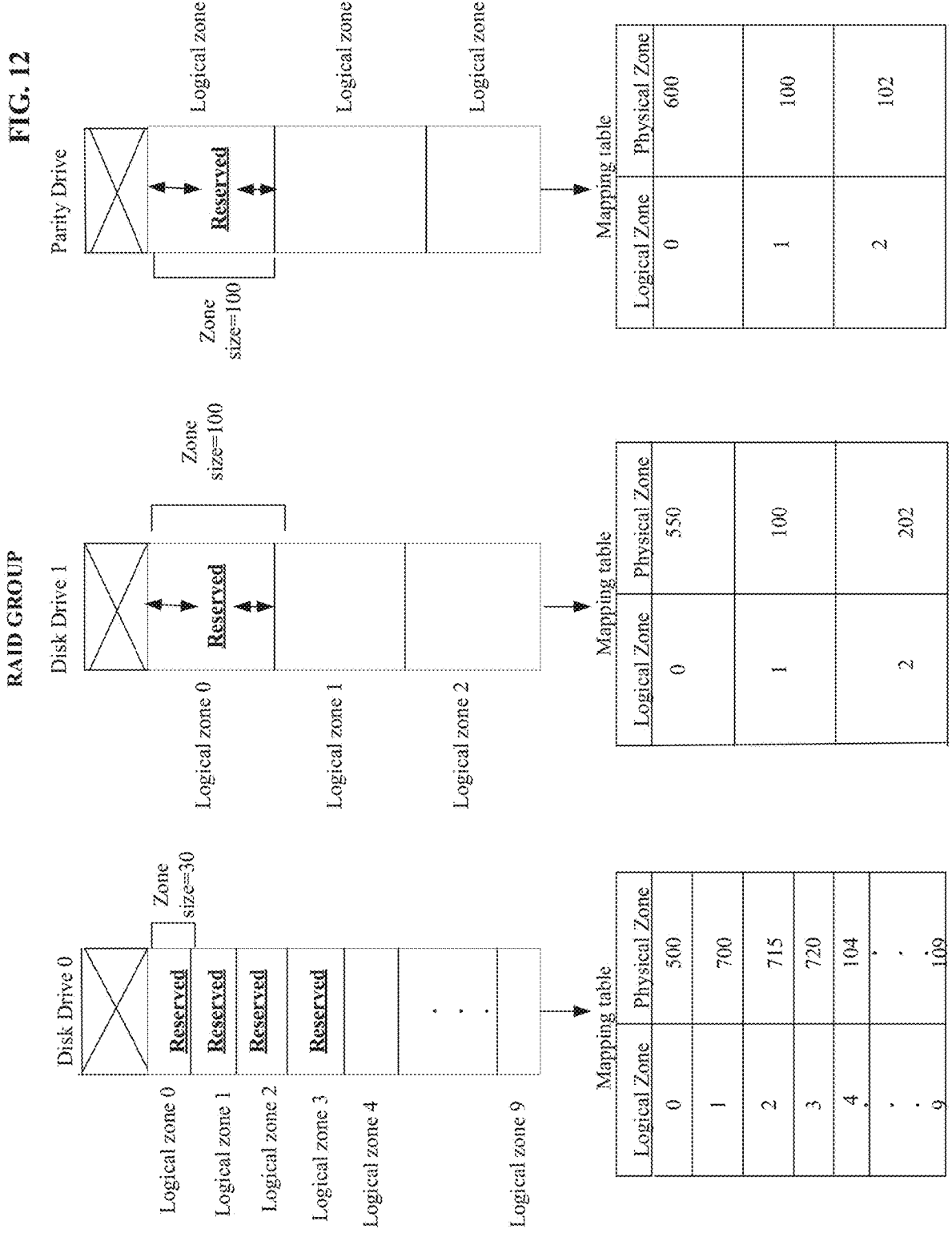

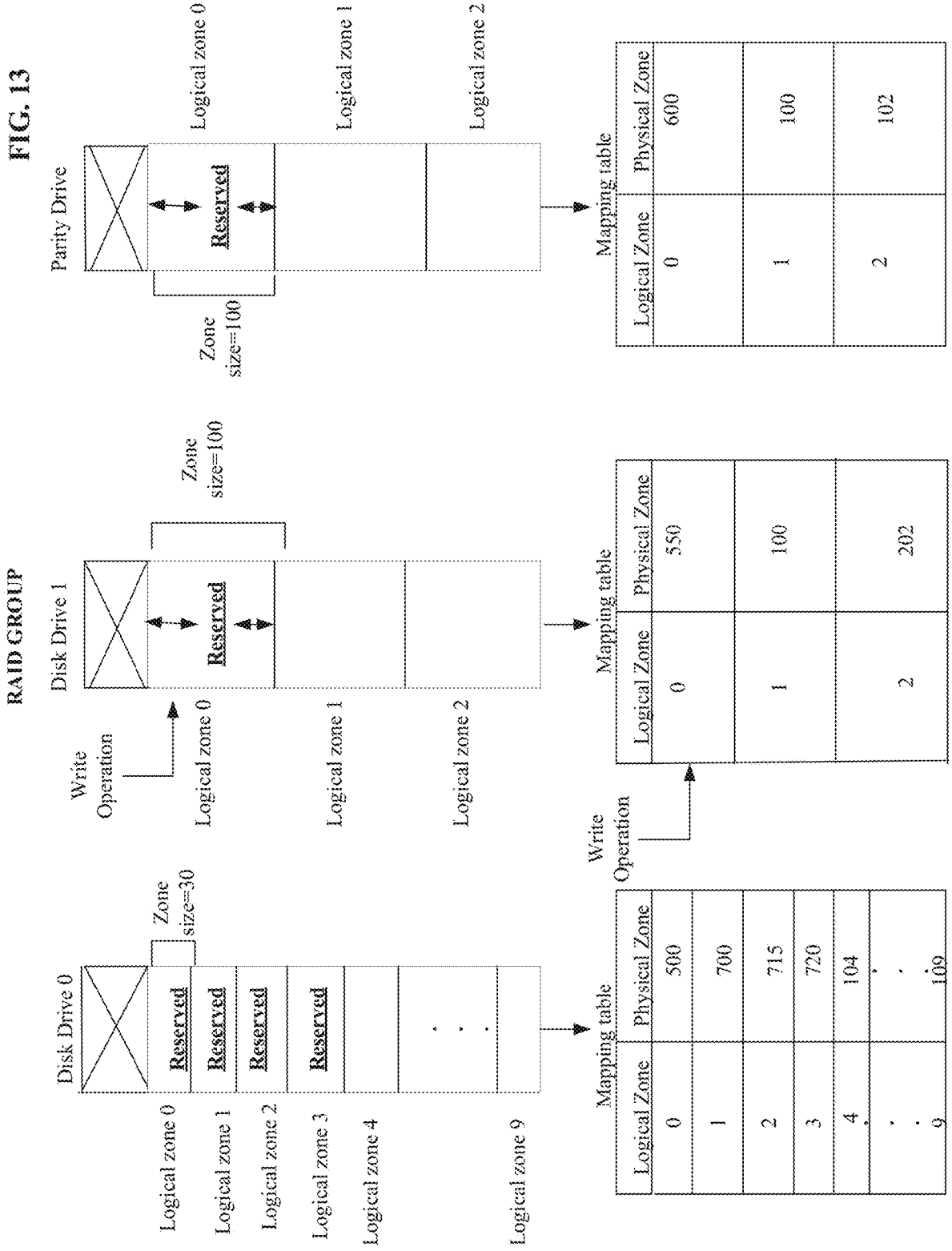

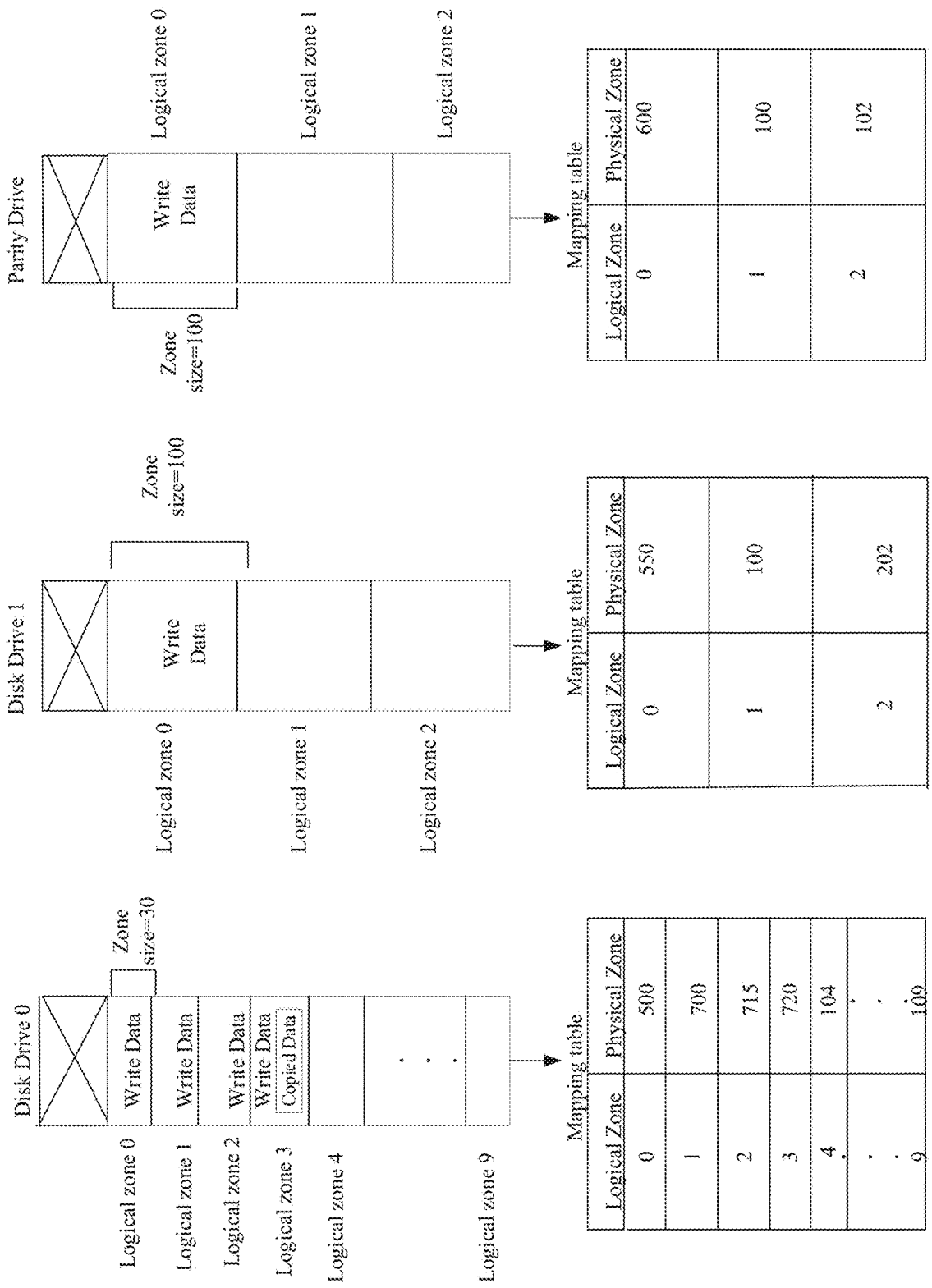

METHODS FOR HANDLING STORAGE DEVICES WITH DIFFERENT ZONE SIZES AND DEVICES THEREOF

FIELD

The present technology pertains to the field of storage management, and particularly, directed to a method for handling storage devices with different zone sizes and devices.

BACKGROUND

A redundant array of independent disks also commonly known as a RAID system generally includes one or more data disks or array of logical unit numbers (LUNs) across which client data is striped and stored. Typically, the RAID system is used when the same data is required to be stored in multiple places or on various hard drives while still having good performance. Further, the file system that is used to perform this RAID functionality is programmed such that a specific input-output operation can be carried out in a specific manner across the different drives within the RAID group. In other words, RAID systems typically require the data disks to have uniform characteristics to enable the file system to perform input-output operations on the data disks.

Supporting RAID with a uniform zoned interface would involve manipulating the zone states in tandem. However, supporting RAID with a non-uniform zoned interface presents challenges, especially with respect to the misaligned regions of the zones. As a result, it is a challenge to manage storage drives within the RAID system with different characteristics.

BRIEF DESCRIPTION OF THE DRAWINGS

FIG. 4 is an exemplary block diagram illustrating a RAID group;

FIG. 12 is an exemplary block diagram illustrating reserving the identified zones within the RAID group;

FIG. 13 is an exemplary block diagram illustrating receiving a write operation within the disk drive of a RAID group; and FIG. 14 is an exemplary block diagram illustrating performing the write operation and releasing the reserved zones.

DETAILED DESCRIPTION

Figure 1:
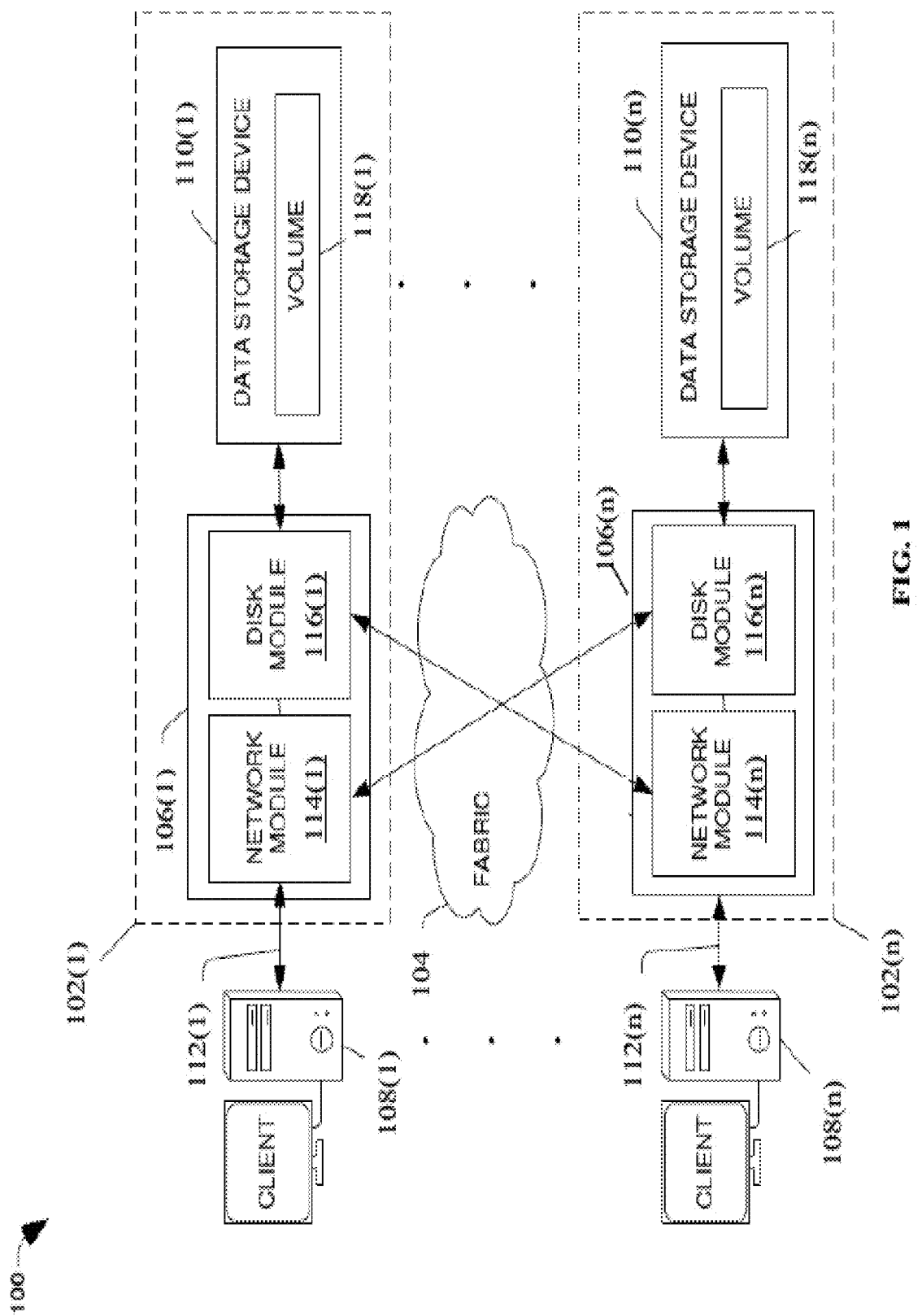
FIG. 1 is a block diagram of a network environment with exemplary data storage apparatuses each including a node computing device.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example), although any number of other elements or components can also be included in the clustered network environment 100 in other examples.

This technology provides a number of advantages including methods, non-transitory computer readable media, and devices that more effectively and efficiently handle storage devices with different zone sizes. With the disclosed technology, RAID system can include zoned disk drives with different zone sizes. Particularly, the disclosed technology determines the prevailing zone size within the RAID group and accepts the prevailing zone size as a de facto zone size for all drives. For the minority of drives that do not have the prevailing zone size, the disclosed technology locks out overlapping zones from further modification. In other words, the disclosed technology locks out the logical block addresses associated with the logical zones so that write pointer bounce is prevented.

In this example, node computing devices 106(1)-106(n) can be primary or local storage controllers or secondary or remote storage controllers that provide client devices 108(1)-108(n), with access to data stored within data storage devices 110(1)-110(n). The data storage apparatuses 102(1)-102(n) and/or node computing device 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations. In another example, a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices or storage (e.g., storage servers), and other computers or peripheral devices, are coupled to the respective data storage apparatuses 102(1)-102(n) by storage network connections 112(1)-112(n). Network connections 112(1)-112(n) may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the client devices 108(1)-108(n) may be general-purpose computers running applications, and may interact with the data storage apparatuses 102(1)-102(n)

using a client/server model for exchange of information. That is, the client devices 108(1)-108(n) may request data from the data storage apparatuses 102(1)-102(n) (e.g., data on one of the data storage devices 110(1)-110(n) managed by a network storage control configured to process I/O commands issued by the client devices 108(1)-108(n)), and the data storage apparatuses 102(1)-102(n) may return results of the request to the client devices 108(1)-108(n) via the storage network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such a node computing device 106(1)-106(n) can be a device attached to the fabric 104 as a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing device 106(1) may be located on a first storage site and the node computing device 106(n) may be located at a second storage site. The node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 108(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices 106 are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to send input-output operations to the node computing devices 106(1)-106(n).

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n) when the node computing device 106(n) is available. Alternatively, when the node computing device 106(n) fails, the network module 114(1) of node computing device 106(1) can access the data storage device 110(n) directly via the cluster fabric 104. The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(n), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI, FCP, SAS, NVMe, NVMe-oF for example, although other protocols can also be used. Thus, as seen from an operating system on node, either of computing devices 106(1)-106(n), the data storage devices 110(1)-110(n) can appear as locally attached. In this manner, different node computing devices 106(1)-106(n), etc. may access data blocks through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, SSDs, storage class memories and any other similar media adapted to store information, including, for example, data (D) and/or parity (P) information.

The aggregates include volumes 118(1)-118(n) in this example, although any number of volumes can be included in the aggregates. The volumes 118(1)-118(n) are virtual data stores that define an arrangement of storage and one or more file systems within the clustered network environment 100. Volumes 118(1)-118(n) can span a portion of a disk or other storage device, a collection of disks, or portions of disks, for example, and typically define an overall logical arrangement of file storage. In one example volumes 118(1)-118(n) can include stored data as one or more files or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(n), such as providing an ability for volumes 118(1)-118(n) to form clusters.

In one example, to facilitate access to data stored on the disks or other structures of the data storage device 110(1)-110(n), a file system (e.g., write anywhere file system (WAFL)) may be implemented that logically organizes the information as a hierarchical structure of directories and files. In this example, respective files may be implemented as a set of disk blocks configured to store information, whereas directories may be implemented as specially formatted files in which information about other files and directories are stored.

Data can be stored as files or objects within a physical volume and/or a virtual volume, which can be associated with respective volume identifiers, such as file system identifiers (FSIDs). The physical volumes correspond to at least a portion of physical storage devices, such as the data storage device 110(1)-110(n) (e.g., a Redundant Array of Independent (or Inexpensive) Disks (RAID system)) whose address, addressable space, location, etc. does not change. Typically the location of the physical volumes does not change in that the (range of) address(es) used to access it generally remains constant.

Virtual volumes, in contrast, are stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows them to be resized and/or flexible in some regards.

Further, virtual volumes can include one or more logical unit numbers (LUNs), directories, Qtrees, and/or files. Among other things, these features, but more particularly the LUNS, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual disks, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

In one example, respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
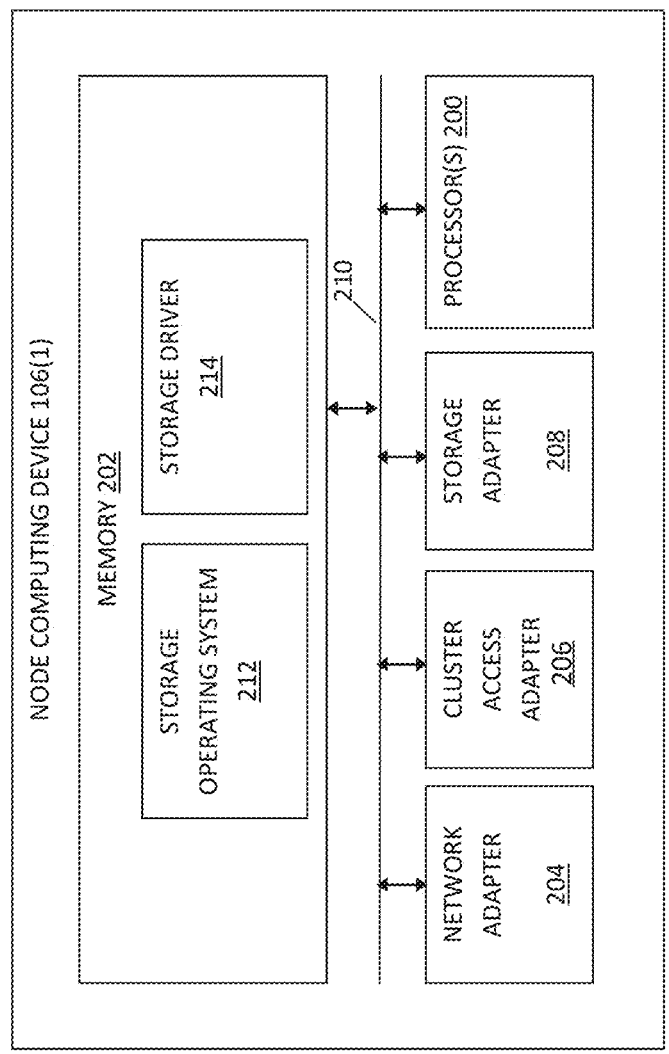
FIG. 2 is a block diagram of an exemplary one of the node computing devices shown in FIG. 1.
Figure 3:
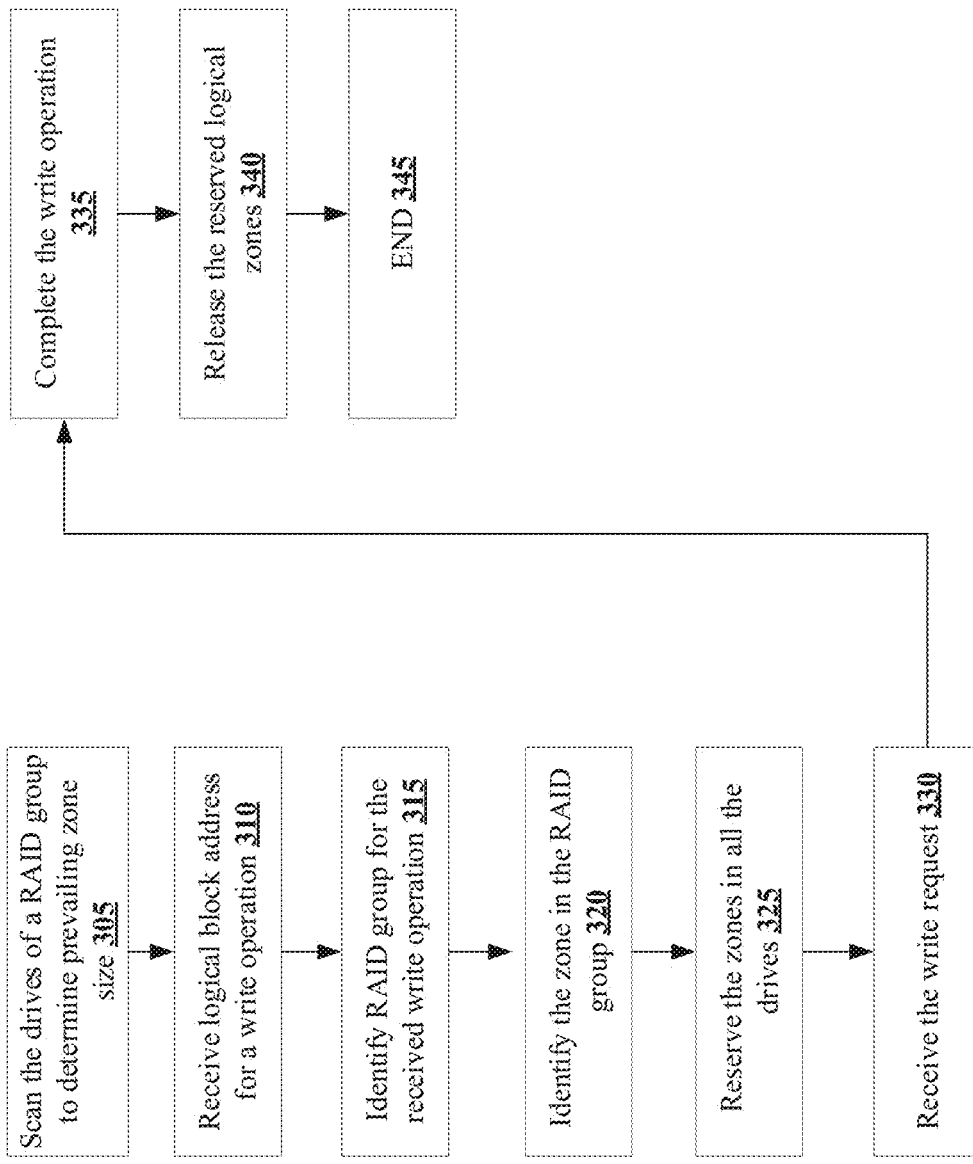
FIG. 3 is a flowchart of an exemplary method for handling storage devices with different zone sizes.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a Redundant Array of Independent (or Inexpensive) Disks (RAID) data loss protection and recovery scheme to optimize a reconstruction process of data of a failed disk or drive in an array. In some examples, the node computing device 106(n) is substantially the same in structure and/or operation as node computing device 106(1), although the node computing device 106(n) can include a different structure and/or operation in one or more aspects than the node computing device 106(1) in other examples.

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The storage operating system 212 can also establish one or more file systems including software code and data structures that implement a persistent hierarchical namespace of files and directories, for example. As an example, when a new data storage device (not shown) is added to a clustered network system, the storage operating system 212 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

Accordingly, the examples may be embodied as one or more non-transitory computer readable media having machine or processor-executable instructions stored thereon for one or more aspects of the present technology, as described and illustrated by way of the examples herein, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-14, for example.

The network adapter 204 in this example includes the mechanical, electrical and signaling circuitry needed to connect the node computing device 106(1) to one or more of the client devices 108(1)-108(n) over storage network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, SSDs, and/or any other similar media adapted to store information.

In the exemplary data storage devices 110(1)-110(n), information can be stored in data blocks on disks. The storage adapter 208 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)), non-volatile memory express (NVMe), or non-volatile memory express over fabrics (NVMeoF). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(n), or alternatively sent to another node computing device attached via the cluster fabric 104. In some examples, a storage driver 214 in the memory 202 interfaces with the storage adapter to facilitate interactions with the data storage devices 110(1)-110(n), as described and illustrated in more detail later with reference to FIGS. 3-14.

Figure 5:
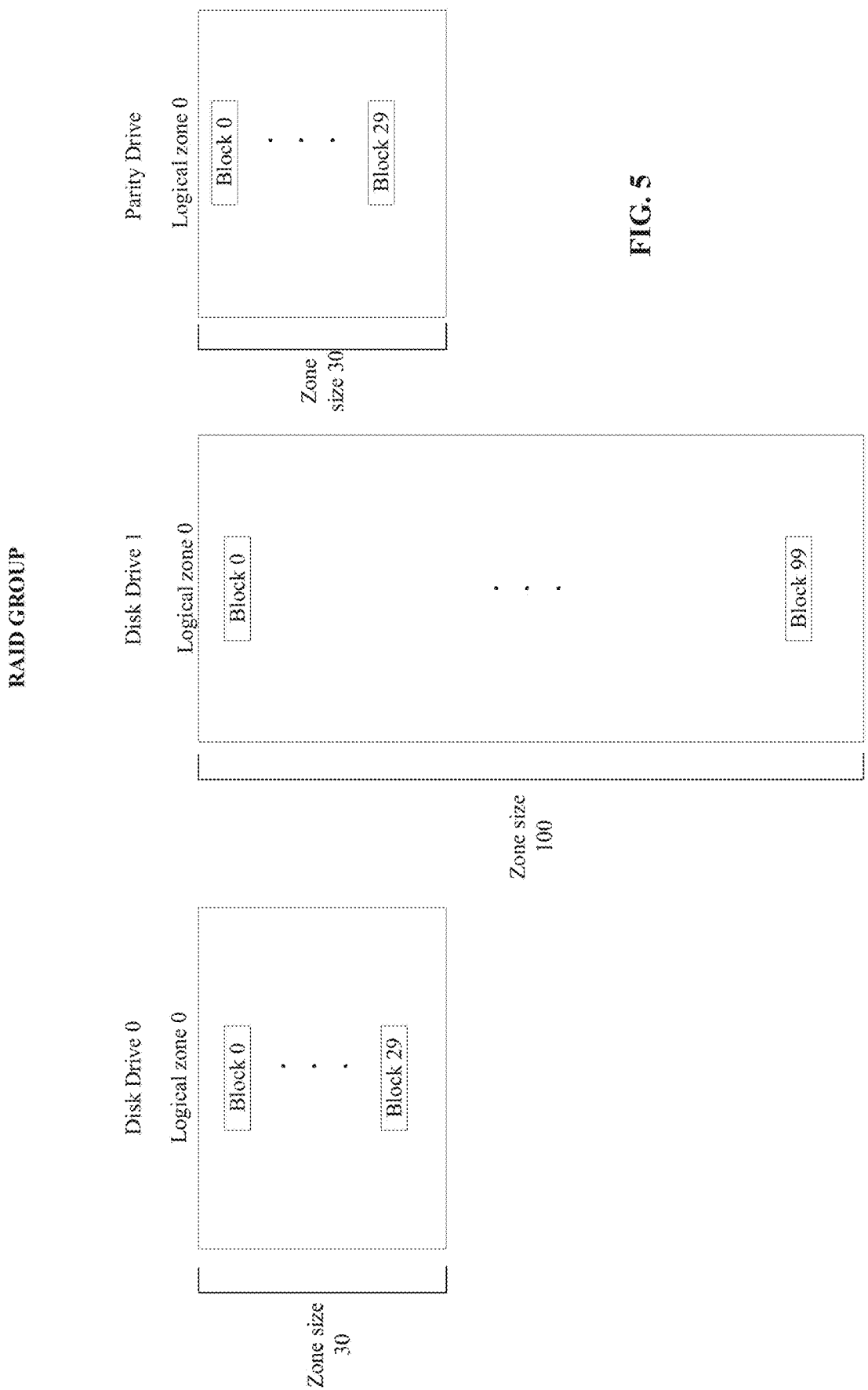
FIG. 5 is an exemplary block diagram illustrating a zone size of the disk drives and the parity drives within the RAID group.

Now, an exemplary method for handling storage devices with different zone sizes will be illustrated with reference to FIGS. 3-14. Particularly with reference to FIG. 3, the exemplary method begins at step 305 where the node computing device 106(1) the node computing device 106(1) scans the one or more disk drives present within the RAID group to determine a prevailing zone size of the one or more disk drives. In this example, zone size relates to the number of blocks present within a zone. Further, in this example, the prevailing zone size is zone size that is the most common zone size among the disk drives and the parity drives within the RAID group, although the prevailing zone size can be identified based on other parameters such as an average of all the zone sizes, or a median value of all the zones sizes. An example of step 305 is illustrated in FIGS. 4-5. By way of example, FIG. 4 illustrates disk drive 0, disk drive 1 and a parity drive along with their corresponding mapping table. Further, the node computing device 106(1) scans the disk drive 0, disk drive 1, and the parity drive to determine the prevailing zone size. An illustration of the zone sizes identified during the scanning is illustrated in FIG. 5. By way of example, the zone size of disk drive 0 and the parity drive is thirty i.e., thirty blocks within each logical zone. However, the zone size of the disk drive 1 is one hundred, i.e., one hundred blocks in each logical zone. In this illustrated example, thirty is the prevailing zone size since two of the three disk drives has the zone size as thirty. Accordingly, the node computing device 106(1) can determine that the prevailing zone size is thirty, although the node computing device 106(1) can also choose hundred as the zone size in other example that will be illustrated in greater detail below using FIGS. 10-14. Additionally, in this example, the zone size is provided by the manufacturer of the disk drives within the RAID group and therefore the zone size of the disk drive can be the same or vary depending on the manufacturer. Zone sizes can also vary across different types of drives from the same manufacturer.

Furthermore, in this example, the node computing device 106(1) determines if there are any misaligned disk drives within the RAID group by identifying the disk drives with zone sizes different from the determined prevailing zone size. In this example, the concept of misaligned disk drives relates to disk drives having zone size different from the determined prevailing zone size. Having different zone sizes leads to a mismatch in the number of blocks in the zone of the disk drives and the prevailing zone size. With reference to FIG. 5 to illustrate an example of step 305, the node computing device 106(1) determines that the disk drive 1 is the misaligned drive as the zone size of disk drive 1 is one hundred when compared to the prevailing zone size which is thirty.

Referring back to step FIG. 3, in step 310 the node computing device 106(1) receives a logical block address or a logical zone for an input-output operation from a write anywhere file system which in turn received the request from a client device 108(1), although the node computing device 106(1) can receive other types or amounts of requests can be received from other devices. While this example illustrates the node computing device 106(1) receiving the request, any other node computing devices illustrated in FIG. 1 may also receive the request. In this example, zone relates to a portion of the disk drive namespace with contiguous logical block address with specific write access rules. By way of example and for purpose of further illustration, the node computing device 106(1) receives a logical block address associated with logical zone 0 of disk drive 0.

In step 315, the node computing device 106(1) identifies the RAID group associated with the received input-output operation based on the logical zone, although the node computing device 106(1) can identify the RAID group using other types or amounts of parameters such as logical blocks or logical block address. In this example, RAID group includes one or more disk drives across which client data is striped and stored; and one or more parity disks that assists with adding an extra layer of data storage to protect against loss of data. Although the RAID group can include other types or amounts of devices in different configurations. Furthermore, the one or more disk drives in the RAID group are configured using the zoned namespace (ZNS), where the logical address space of the namespace is divided into zones, although the one or more disk drives can be configured to operate under different standards. Further, each logical zone includes one or more logical blocks that are written strictly sequentially and the logical zone must be reset before the logical blocks can be updated. In this example, a logical block is a smallest unit of storage within a disk drive.

FIG. 4 illustrates the RAID group identified by the node computing device 106(1) for the received write operation, by way of example. As illustrated in FIG. 4, each of the disk drives (0, 1, and parity) has a corresponding mapping table that includes mapping between the logical zone and the corresponding physical zone within the disk drive. For example, for the disk drive 0 illustrated in FIG. 4, the logical zone 0 within the mapping table 0 correlates to physical zone 100 within the disk drive 0. Similarly within mapping table 0, logical zone 1 corresponds to physical zone 101, logical zone 2 corresponds to physical zone 102, logical zone 3 corresponds to physical zone 103, logical zone 4 corresponds to physical zone 104 and logical zone 9 corresponds to physical zone 109, by way of example. Accordingly, for the received write request of logical zone 0 in the example of FIG. 3, the corresponding physical zone is 100. Similarly, FIG. 4 illustrates the mapping table 1 that is associated with the disk drive 1 and mapping table 2 that is associated with the parity drive of the identified RAID group.

Figure 6:
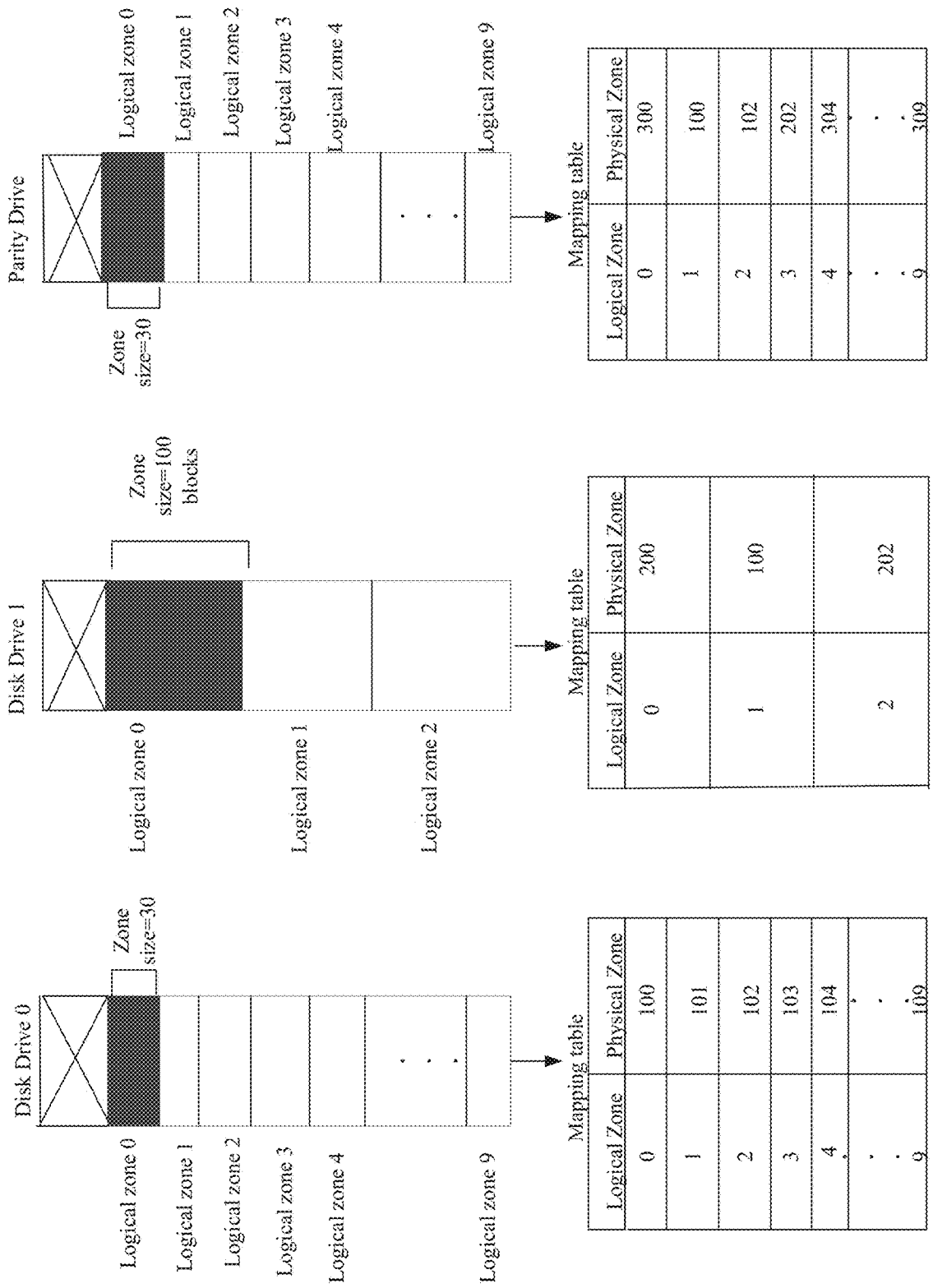
FIG. 6 is an exemplary block diagram illustrating identifying zones within the RAID group.

In step 320, the node computing device 106(1) identifies the logical zone(s) to reserve in each of the disk drives and the parity drives within the RAID group based on the received logical zone and the determined prevailing zone size. An example of step 320 is illustrated in FIG. 6 where the node computing device 106(1) identifies logical zone 0 in disk drive 0, logical zone 0 in disk drive 1, and logical zone 0 in the parity drive since the determined zone size is thirty since the received logical zone to which the write operation is to be performed is logical zone 0. In other words, logical zone 0 in disk drive 0 has a zone size of thirty (i.e., thirty blocks within the logical zone 0), logical zone 0 in the disk drive 1 has a zone size of hundred and since thirty is within one hundred, entire logical zone 0 of disk drive 1 is identified and logical zone 0 of the parity zone having zone size thirty is identified by the node computing device 106(1).

Figure 7:
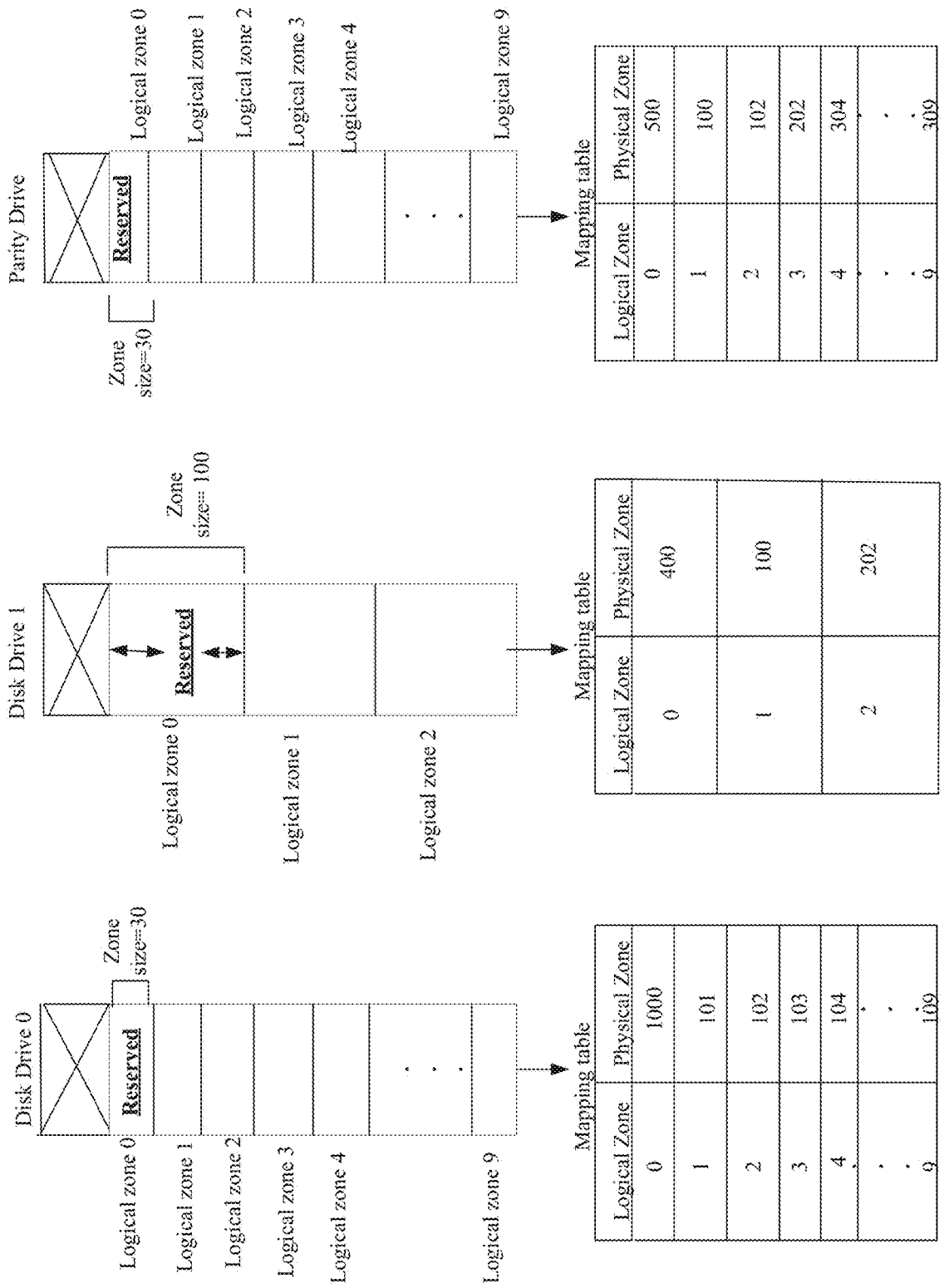
FIG. 7 is an exemplary block diagram illustrating reserving the identified zones within the RAID group.

Referring again to FIG. 3, in step 325, the node computing device 106(1) reserves the identified logical zone in all the disk drives and the parity drives within the RAID group. In this example, by reserving the logical zones, the node computing device 106(1) would not allow other writes to be performed in the reserved logical zones other than the pending writes and read operations are supported by the reserved logical zones. An example of step 325 is illustrated in FIG. 7 where the node computing device 106(1) reserves the logical zone 0 in disk drive 0, logical zone 0 in disk drive 1, and logical zone 0 in the parity drive.

Figure 8:
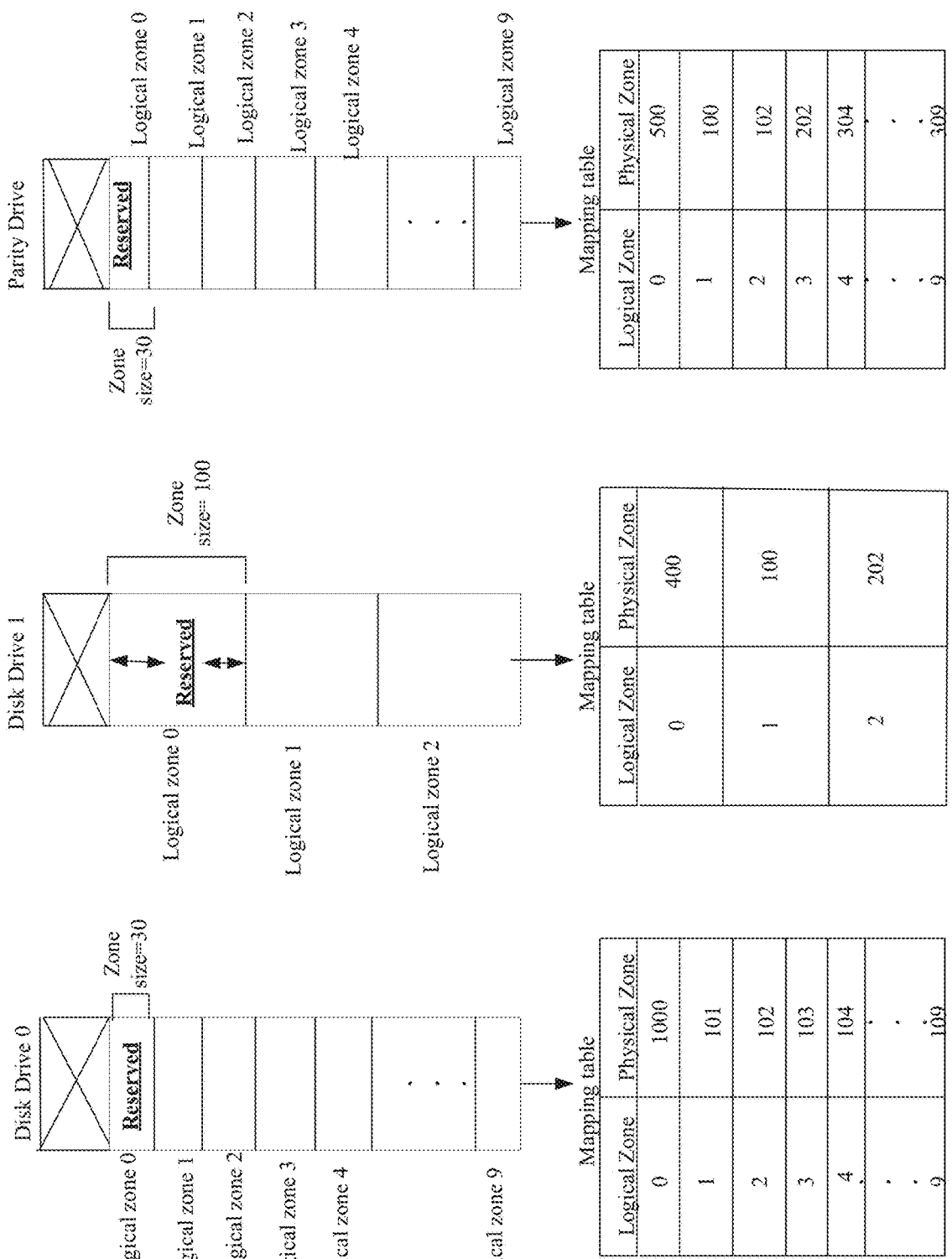
FIG. 8 is an exemplary block diagram illustrating receiving a write operation within the disk drive of a RAID group.

Referring again to FIG. 3, in step 330, the node computing device 106(1) receives the write request from the write anywhere file system. An example of step 330 where the node computing device 106(1) receiving a write operation to write thirty blocks of data in the logical zone 0 of disk drive 0 is illustrated in FIG. 8.

Figure 9:
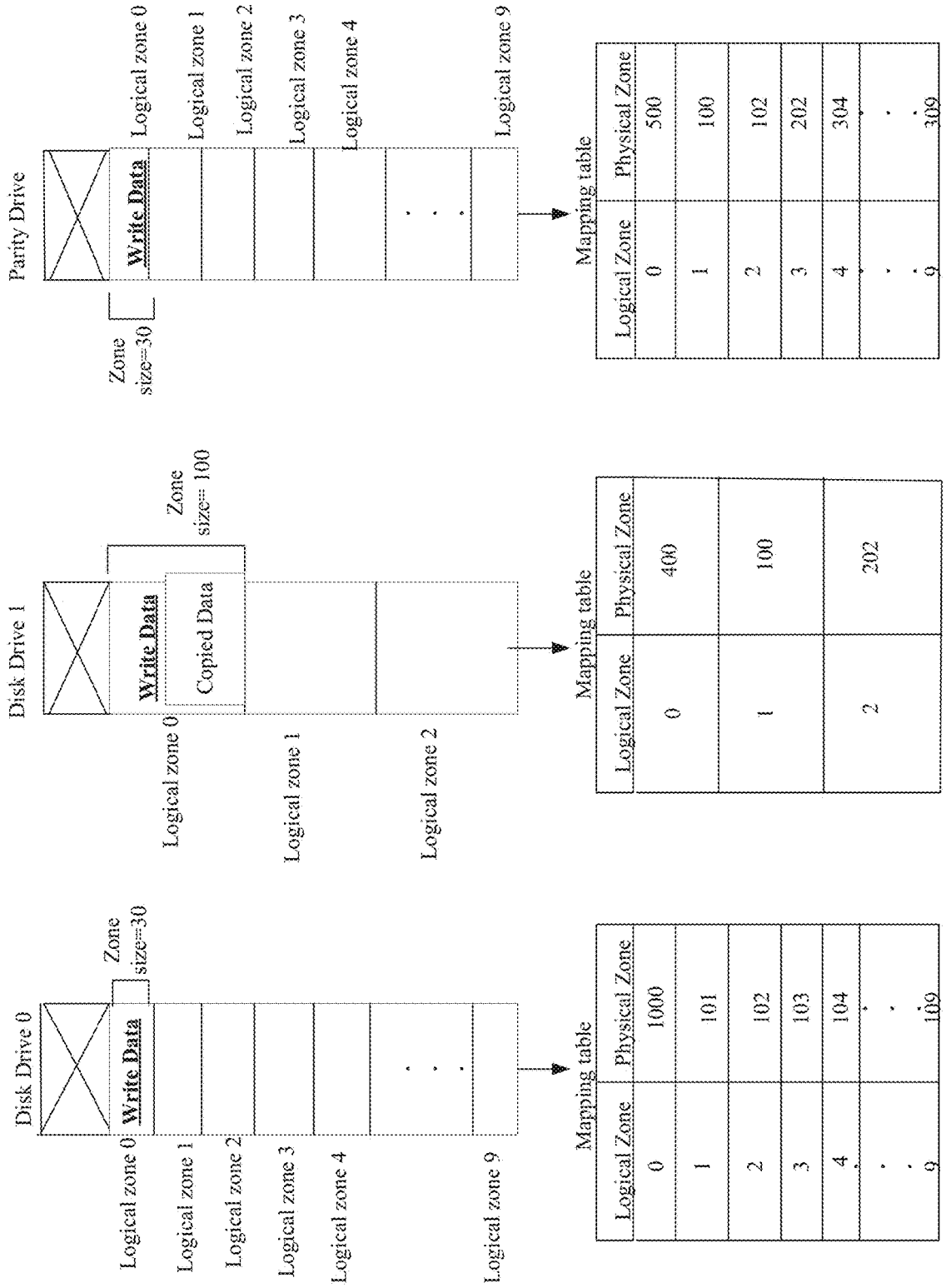
FIG. 9 is an exemplary block diagram illustrating performing the write operation and releasing the reserved zones.
Figure 10:
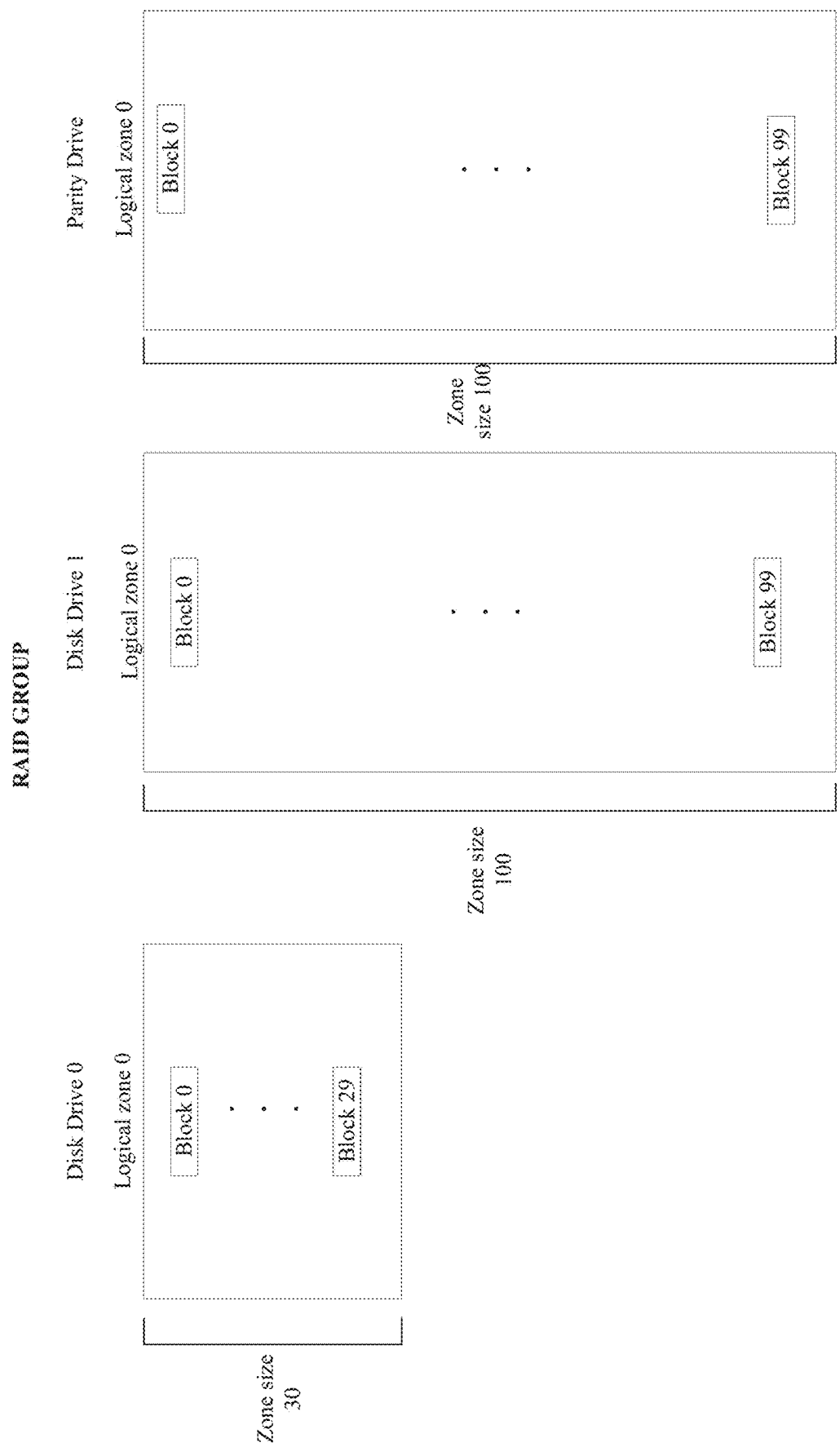
FIG. 10 is an exemplary block diagram illustrating a zone size of the disk drives and the parity drives within the RAID group.

Referring again to FIG. 3, in step 335, the node computing device 106(1) completes the received write operation by writing the data into the reserved logical zones in the disk drives and the parity drives within the RAID group. An example of step 340 is illustrated in FIG. 9, where the node computing device 106(1) writes the data into logical zone 0 of the disk drive 0, logical zone 0 of disk drive 1, and the logical zone 0 of the parity drive within the RAID group. As previously illustrated, the zone size of logical zone 0 of the disk drive 0 and the logical zone 0 of the parity drive is thirty and by writing the received data, the node computing device 106(1) completely writes all the blocks within the logical zone 0 of the disk drive 0 and the parity drive. However, the zone size of logical zone 0 of the disk drive 1 is one hundred, i.e. one hundred blocks within the logical zone 0, the node computing device 106(1) first writes the received thirty blocks of data into the logical zone 0 of disk drive 1. Next, the node computing device 106(1) then copies the remaining seventy blocks of data from the previous version of the logical zone 0 of the disk drive 1 and by doing so, would fill in all the one hundred blocks of the logical zone 0. Additionally, in this example, the node computing device 106(1) writes parity data into the parity drive so that the parity drive can be used to reconstruct disk drive 0 when the disk drive 0 fails within the RAID group.

In step 340, the node computing device 106(1) releases the reserved logical zones in all the disk drives in the RAID group so that the logical zones can be used to perform subsequent writes and the exemplary method ends at step 345.

Another example of handling storage devices with different zone sizes will now be illustrated with FIGS. 10-14. First, the node computing device 106(1) scans the drives of a RAID group to determine the prevailing zone size in the RAID group illustrated in FIG. 10. In this example, the node computing device 106(1) scans disk drive 0, disk drive 1, and the parity drive to determine that the zone size is thirty, one hundred, and one hundred respectively. Since the zone size one hundred is prevailing, the node computing device 106(1) would determine the prevailing zone size to be one hundred.

Next, the node computing device 106(1) receives the logical block address or the logical zone from the write anywhere file system. In this example and for purpose of further illustration, the node computing device 106(1) receives logical zone 0 of disk drive 1 as the location to perform a write operation.

Figure 11:
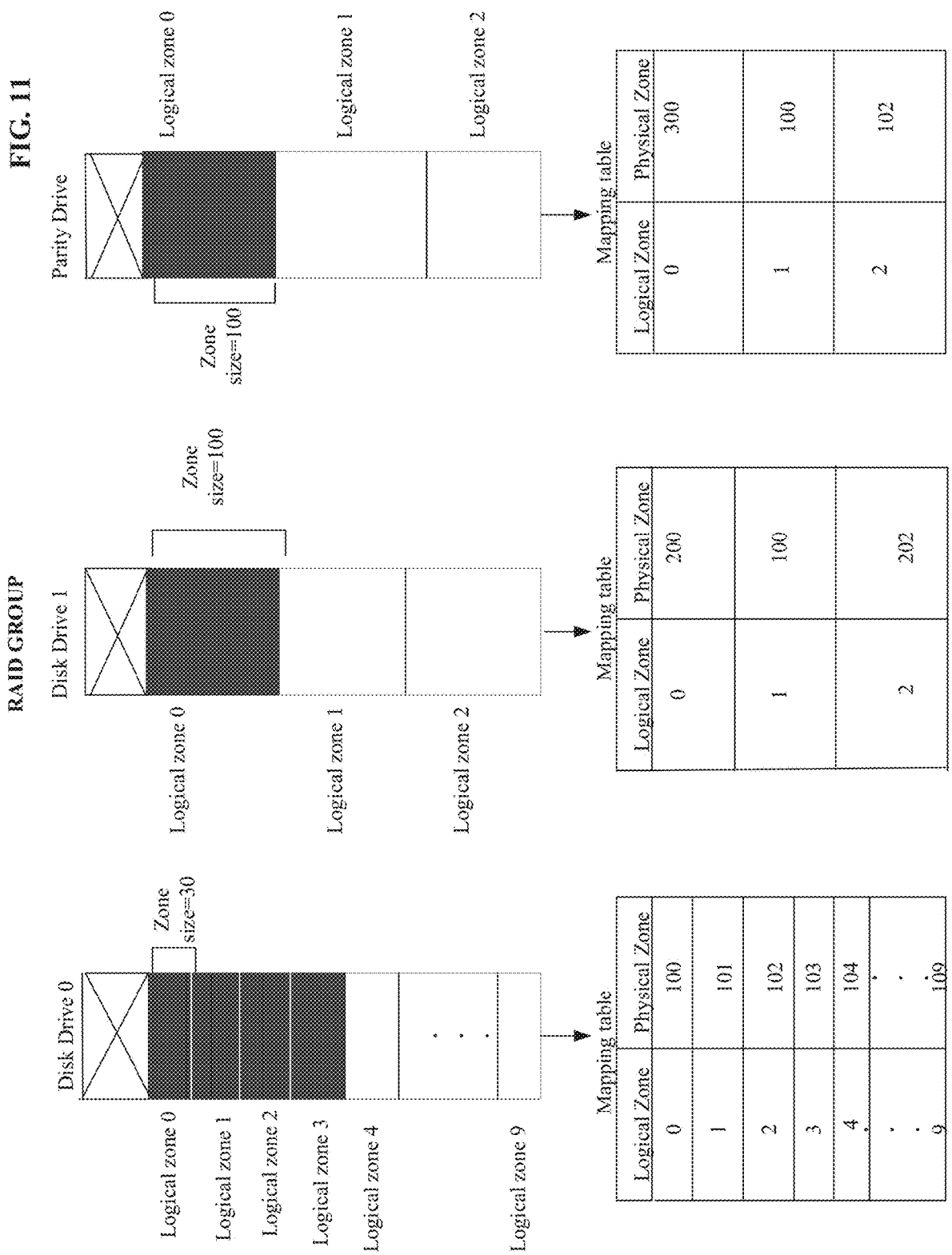
FIG. 11 is an exemplary block diagram illustrating identifying zones within the RAID group.

Further, the node computing device 106(1) identifies the logical zone(s) to perform the received write operation based on determined prevailing zone size and the received logical zone. The step of identifying the logical zone(s) will now be further illustrated with reference to FIG. 11. As illustrated in FIG. 11, the node computing device 106(1) identifies logical zone 0, logical zone 1, logical zone 2, and logical zone 3 of disk drive 0 and logical zone 0 of the parity drive to perform the write operation. The reason the node computing device 106(1) identifies logical zone 0, logical zone 1, logical zone 2, and logical zone 3 of disk drive 0 is because the zone size of disk drive is thirty and in order to match the determined prevailing zone size, i.e., one hundred, the node computing device 106(1) identify over three logical zones in disk drive 0. In this example, even though only a portion of logical zone 3 would be required, the entire logical zone 3 is identified. However, the node computing device 106(1) only identifies logical zone 0 in the parity drive since the zone size of the parity drive is one hundred and that is consistent with the determined prevailing zone size.

Next, the node computing device 106(1) reserves the identified logical zone(s) and this step will now be further illustrated with reference to FIG. 12. As illustrated in FIG. 12, the node computing device 106(1) reserves the logical zone 0, logical zone 1, logical zone 2, and the entire logical zone 3 of the disk drive 0, logical zone 0 of disk drive 1, and logical zone 0 of the parity drive. By reserving the logical zone(s), the node computing device 106(1) would not allow other write operations to be performed in the reserved logical zones other than the pending write operation. Additionally in this example, if the prevailing zone size is one hundred (one hundred data blocks within a zone) and one of the zone sizes of a disk drive is thirty (thirty blocks within a zone), then an attempt to reserve a one hundred to one hundred and ninety nine blocks will be blocked by the node computing device 106(1) to protect the underlying physical zone that straddles the two ranges.

Next, the node computing device 106(1) receives the data to write from the write anywhere file system to the reserved logical zone 0 of disk drive 1 as illustrated in FIG. 13. In this example, the received write request is to write one hundred blocks of data into the logical zone 0 of the disk drive 1.

Next, the node computing device 106(1) writes the received data in the reserved logical zone(s) and this step will be further illustrated with reference to FIG. 14. As illustrated in FIG. 14, the node computing device 106(1) writes the received data one hundred blocks to logical zone 0 of disk drive 1, logical zone 0 of the parity drive, and logical zone 0, logical zone 1, logical zone 2 and a portion of logical zone 3 of the disk drive 0. Since the data to be written is one hundred blocks, ten blocks of the logical zone 3 of the disk drive 0 would be used along with the entire logical zone 0, logical zone 1, and logical zone 2 of the disk drive 0. After writing the data to a portion (ten blocks) of the logical zone 3 of the disk drive 0, if the node computing device 106(1) determines that the remaining data blocks are empty, the node computing device 106(1) copies the remaining twenty blocks of data from the previous version of the logical zone 3 of the disk drive 0. Once the node computing device 106(1) completes the received write operation, the node computing device 106(1) releases the reserved logical zone(s) for subsequent write operations.

Accordingly, this technology provides a number of advantages including methods, non-transitory computer readable media, and devices that more effectively and efficiently handle storage devices with different zone sizes. With the disclosed technology, RAID can be applied across disk drives with different zone sizes. Particularly, the disclosed technology determines the prevailing zone size within the RAID system and accepts the prevailing zone size as a de facto zone size for all drives. For the minority of drives that do not have the prevailing zone size, the disclosed technology locks out logical zones from further modification. In other words, the disclosed technology locks out the logical block addresses associated with the logical zones so that write pointer bounce is prevented.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method, comprising:
   determining, by a computing device, a first subset of a plurality of zoned namespace (ZNS) drives each having a first zone size and a second subset of the ZNS drives each having a second zone size larger than the first zone size, wherein the first and second subsets of the ZNS drives are within a redundant array of independent disks (RAID) group;
   selecting, by the computing device, the second zone size as a prevailing zone size for the RAID group;
   reserving, by the computing device, a plurality of logical zones within each ZNS drive of the first subset of the ZNS drives and another logical zone in each ZNS drive of the second subset of the ZNS drives for a received input-output operation based on the determined prevailing zone size, wherein the logical zones of the plurality of logical zones within each ZNS drive of the first subset of the ZNS drives are collectively at least as large as the prevailing zone size and at least one of the reserved plurality of logical zones within each ZNS drive of the first subset of the ZNS drives maps to a physical zone that straddles multiple data block ranges that each correspond to the prevailing zone size; and
   completing, by the computing device, the received input-output operation by striping data associated with the received input-output operation across the reserved plurality of logical zones within each ZNS drive of the first subset of the ZNS drives and the other logical zone within each ZNS drive of the second subset of the ZNS drives.

2. The method as set forth in claim 1, further comprising releasing, by the computing device, the reserved plurality of logical zones within each ZNS drive of the first subset of the ZNS drives and the other logical zone within each ZNS drive of the second subset of the ZNS drives after completing the received input-output operation.

3. The method as set forth in claim 1, wherein the reservation of the plurality of logical zones within each ZNS drive of the first subset of the ZNS drives and the other logical zone within each ZNS drive of the second subset of the ZNS drives prevents another input-output operation from using the reserved plurality of logical zones within each ZNS drive of the first subset of the ZNS drives and the other logical zone within each ZNS drive of the second subset of the ZNS drives.

4. The method as set forth in claim 1, further comprising identifying, by the computing device, the first subset of the ZNS drives having a zone size different than the prevailing zone size as including one or more misaligned drives.

5. The method as set forth in claim 1, wherein each of the logical zones of the plurality of logical zones within each ZNS drive of the first subset of the ZNS drives corresponds to a first physical zone that comprises a smaller number of physical data blocks than a second physical zone associated with each of the other logical zones within each ZNS drive of the second subset of the ZNS drives.

6. A non-transitory machine readable medium having stored thereon instructions comprising machine executable code which when executed by at least one machine causes the machine to:
   determine a first subset of a plurality of zoned namespace (ZNS) drives each having a first zone size and a second subset of the ZNS drives each having a second zone size larger than the first zone size, wherein the first and second subsets of the ZNS drives are within a redundant array of independent disks (RAID) group;
   select the second zone size as a prevailing zone size for the RAID group;
   reserve a plurality of logical zones within each ZNS drive of the first subset of the ZNS drives and another logical zone in each ZNS drive of the second subset of the ZNS drives for a received input-output operation based on the determined prevailing zone size, wherein the logical zones of the plurality of logical zones within each ZNS drive of the first subset of the ZNS drives are collectively at least as large as the prevailing zone size and at least one of the reserved plurality of logical zones within each ZNS drive of the first subset of the ZNS drives maps to a physical zone that straddles multiple data block ranges that each correspond to the prevailing zone size; and
   complete the received input-output operation by striping data associated with the received input-output operation across the reserved plurality of logical zones within each ZNS drive of the first subset of the ZNS drives and the other logical zone within each ZNS drive of the second subset of the ZNS drives.

7. The non-transitory machine readable medium as set forth in claim 6, wherein the machine executable code, when executed by the machine, further causes the machine to release the reserved plurality of logical zones within each ZNS drive of the first subset of the ZNS drives and the other logical zone within each ZNS drive of the second subset of the ZNS drives after completing the received input-output operation.

8. The non-transitory machine readable medium as set forth in claim 6, wherein the reservation of the plurality of logical zones within each ZNS drive of the first subset of the ZNS drives and the other logical zone within each ZNS drive of the second subset of the ZNS drives prevents another input-output operation from using the reserved plurality of logical zones within each ZNS drive of the first subset of the ZNS drives and the other logical zone within each ZNS drive of the second subset of the ZNS drives.

9. The non-transitory machine readable medium as set forth in claim 6, wherein the machine executable code, when executed by the machine, further causes the machine to identify the first subset of the ZNS drives having a zone size different than the prevailing zone size as including one or more misaligned drives.

10. The non-transitory machine readable medium as set forth in claim 6, wherein each of the logical zones of the plurality of logical zones within each ZNS drive of the first subset of the ZNS drives corresponds to a first physical zone that comprises a smaller number of physical data blocks than a second physical zone associated with each of the other logical zones within each ZNS drive of the second subset of the ZNS drives.

11. A computing device comprising:
a memory containing machine readable medium comprising machine executable code having stored thereon instructions; and
a processor coupled to the memory, the processor configured to execute the machine executable code to cause the processor to:
determine a first subset of a plurality of zoned namespace (ZNS) drives each having a first zone size and a second subset of the ZNS drives each having a second zone size larger than the first zone size, wherein the first and second subsets of the ZNS drives are within a redundant array of independent disks (RAID) group;
select the second zone size as a prevailing zone size for the RAID group;
reserve a plurality of logical zones within each ZNS drive of the first subset of the ZNS drives and another logical zone in each ZNS drive of the second subset of the ZNS drives for a received input-output operation based on the determined prevailing zone size, wherein the logical zones of the plurality of logical zones within each ZNS drive of the first subset of the ZNS drives are collectively at least as large as the prevailing zone size and at least one of the reserved plurality of logical zones within each ZNS drive of the first subset of the ZNS drives maps to a physical zone that straddles multiple data block ranges that each correspond to the prevailing zone size; and
complete the received input-output operation by striping data associated with the received input-output operation across the reserved plurality of logical zones within each ZNS drive of the first subset of the ZNS drives and the other logical zone within each ZNS drive of the second subset of the ZNS drives.

12. The computing device as set forth in claim 11 wherein the processor is further configured to execute the machine executable code to further cause the processor to release the reserved plurality of logical zones within each ZNS drive of the first subset of the ZNS drives and the other logical zone within each ZNS drive of the second subset of the ZNS drives after completing the received input-output operation.

13. The computing device as set forth in claim 11, wherein the processor is further configured to execute the machine executable code to further cause the processor to identify the first subset of the ZNS drives having a zone size different than the prevailing zone size as including one or more misaligned drives.

14. The computing device as set forth in claim 11, wherein the reservation of the plurality of logical zones within each ZNS drive of the first subset of the ZNS drives and the other logical zone within each ZNS drive of the second subset of the ZNS drives prevents another input-output operation from using the reserved plurality of logical zones within each ZNS drive of the first subset of the ZNS drives and the other logical zone within each ZNS drive of the second subset of the ZNS drives.

15. The computing device as set forth in claim 11, wherein each of the logical zones of the plurality of logical zones within each ZNS drive of the first subset of the ZNS drives corresponds to a first physical zone that comprises a smaller number of physical data blocks than a second physical zone associated with each of the other logical zones within each ZNS drive of the second subset of the ZNS drives.

* * * * *